E. D. FRENCH.
PLOW.
No. 188,508.  Patented March 20, 1877.
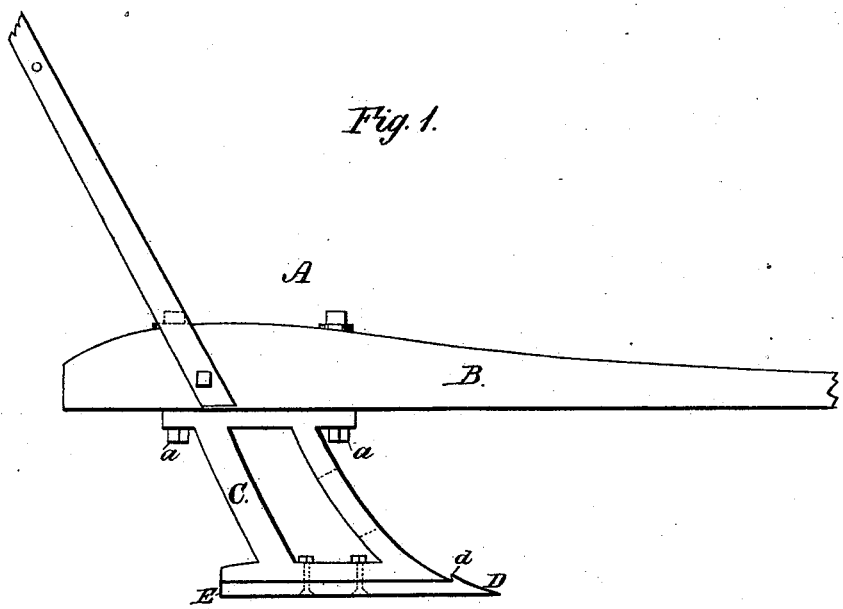
Fig. 1.
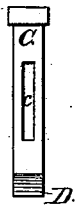 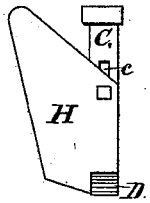 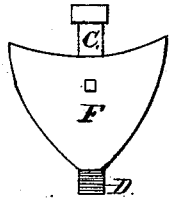 
Fig. 2.  Fig. 3.  Fig. 4.  Fig. 5.
WITNESSES:  INVENTOR:
E. D. French
BY
ATTORNEYS.

UNITED STATES PATENT OFFICE.

ERVIN D. FRENCH, OF BYHALIA, MISSISSIPPI, ASSIGNOR TO HIMSELF AND JAMES L. HARRIS, OF SAME PLACE.

IMPROVEMENT IN PLOWS.

Specification forming part of Letters Patent No. 188,508, dated March 20, 1877; application filed August 21, 1876.

*To all whom it may concern:*

Be it known that I, ERVIN D. FRENCH, of Byhalia, in the county of Marshall and State of Mississippi, have invented a new and useful Improvement in Plows; and I do hereby declare that the following is a full, clear, and exact description of the same, reference being had to the accompanying drawings, forming part of this specification, in which—

Figure 1 is a side elevation. Figs. 2, 3, 4, 5 are detail views.

The object of the invention is the construction of a plow provided with detachable point, to which may quickly and readily be adjusted a common shovel or subsoil-plow, or other similar agricultural implement.

The invention consists in fixing firmly to the beam of a plow a frame made of cast-iron or other suitable material, and shaped like an oblique parallelogram—*i. e.*, diamond-shaped—but with its front bar curving downward and forward. Said frame is fixed by its upper horizontal bar to the plow-beam, and has firmly attached, by screws or otherwise, to the lower surface of its lower horizontal bar a second bar, which carries the point of the plow, the latter being made in one piece, or welded to said second bar, and making a shoulder with it, which, when the bar and point are in place, serves as a support for the attached implement.

The necessary tool may be attached to the frame by means of clamp-screws, and of a slot, with which its curving front bar is provided.

In the drawing, A represents a plow, B being the plow-beam, and C a parallelogram or diamond-shaped frame attached to the latter by the bolts and nuts. (Seen at *a a.*) D is the plow-point fixed on the bar E, and forming with it the shoulder *d*, which, when said bar E is in place, serves as a support to the attached tool.

The frame C has a slot, *c*, in its front bar, which curves downward and forward from the plow-beam, by means of which slot and by clamp-screw the necessary tool may be attached to the plow.

The length of attachment which the bar E gives to the point of the plow gives the latter a much firmer union with the plow, and a much more secure support, by means of the shoulder *d*, to the attached implement.

F, G, and H are various implements, shown attached to the parallelogram or diamond-shaped frame.

Having thus described my invention, what I claim as new is—

1. The combination, with the plow-beam B, of the parallelogram or diamond-shaped frame C, provided on its front bar with the slot *c*, and of the part E D, composed of shoe or sole and point, and provided with the shoulder *d*, substantially as shown and described, for the purpose specified.

2. The combination, with the plow-beam B, and parallelogram or diamond-shaped frame C, of the part E D, shoulder *d*, and plow-blade F, substantially as shown and described, for the purpose specified.

ERVIN D. FRENCH.

Witnesses:
JNO. ABERNATHY,
JAMES C. YOUNG.